United States Patent Office 3,739,007
Patented June 12, 1973

3,739,007
PROCESS FOR PREPARING ALIPHATIC NITRILES OF INCREASED CARBON CHAIN LENGTH
Irving Schwager, Hopewell Junction, and Robert M. Suggitt, Wappingers Falls, N.Y. (both % Texaco, Inc., P.O. Box 509, Beacon, N.Y. 12508)
No Drawing. Filed Aug. 26, 1970, Ser. No. 67,243
Int. Cl. C07c 121/02
U.S. Cl. 260—464     5 Claims

ABSTRACT OF THE DISCLOSURE

This process concerns the preparation of aliphatic nitriles, particularly nitriles having an increased carbon chain length by the addition of acetonitrile to aliphatic olefins containing 6 to 20 carbon atoms by a free radical initiated addition reaction at temperatures of 150° to 180° C. using mole ratios of acetonitrile to olefin ranging from about 100 to 200.

This invention concerns the preparation of aliphatic nitriles by a free radical initiated addition reaction.

More particularly, this invention relates to the preparation of higher aliphatic nitriles by the free-radical catalysed addition of acetonitrile to olefins under mild reaction conditions.

BACKGROUND OF THE INVENTION

Nitriles are valuable starting materials in organic chemistry because they contain a highly reactive triple linkage, i.e. —C≡N. For example, the nitriles as a class lend themselves to hydrolysis in either acid or basic solution. In the acidic hydrolysis the intermediate product is first the intermediate amide then in most instances the corresponding acid, and the salt of the acid in the latter instance. Other reactions of importance which the nitriles are capable of as a class are reduction to the amine, esterification with alcohols, thiohydration with alkaline sulfides, Grignard reactions to ketones and numerous types of condensations. In addition, in some instances the nitriles have been useful in themselves as rubber softeners or extenders.

While numerous methods of preparing nitriles, particularly of the fatty acid type, are available, the processes are generally classified in two major classes. Those in which the carbon chain of at least one of the reactants remains the same or is diminished and those in which the chain is lengthened. Currently, in the former class of procedures, most nitriles are produced by the reaction of fatty acids with ammonia. While the process is advantageous in several respects, the molecular weight fatty acids required to produce the corresponding nitriles (wherein the carbon range is between $C_6$ and $C_{14}$) are not always available in large quantities at attractive costs. For situations such as these where lengthening the carbon chain is desired, various alternative metathetical processes have been employed. These include reacting aliphatic halides or sulfates with the metal cyanide and the addition of hydrogen cyanide to olefinic or acetylenic compounds. One of the more potentially promising preparative methods wherein nitriles of extended carbon chain length are desired is the addition of acetonitrile to unsaturated compounds. Not only does the procedure lengthen the carbon chain of the reactants but the method is also attractive in that both reactants are currently available in large quantities in a high state of purity at relatively modest cost. For instance, acetonitrile is used widely as an inermediate for a number of industrially available products such as acetophenone, 1-naphthaleneacetic acid and Vitamin B, among others. Similarly, with large quantities of olefins being available from the cracking of paraffin charge stock, they too have become attractive coreactants.

Recently a publication of Allen et al.[1] disclosed the free radical initiated addition of compounds having a reactive methylene group (such as acetonitrile) to suitable olefins to produce nitriles of increased chain length. Two variations of the addition of acetonitrile to 1-octene are disclosed which we consider the closests known art. In one method a mixture of 1-octene, acetonitrile and benzoyl peroxide initiator is heated under reflux at 82° C. for 48 hours to produce decanenitrile. In the second variation described, a mixture of di-isopropyl peroxydicarbonate initiator and 1-octene coreactant is added dropwise to refluxing acetonitrile. In both instances the expected decanenitrile addition product is formed. While the published procedure is said to be advantageous in that it proceeds at moderate reaction conditions of temperature and pressures, it has several serious shortcomings; poor yield, lengthy reaction times and its apparent applicability only to alpha olefin substrates. Further, although nothing is said of telomerization in the article, the formation of substantial quantities of high molecular weight telomer is a probable contributing cause to the low yields of product obtained. These shortcomings can be established by examining the data relative to acetonitrile addition to 1-octene presented in the article. For instance, while both runs utilized different initiators, they both required a period of some hours for completion, both runs produced essentially identical and low yields of 17% and 18%, based upon the initial amount of olefin (1-octene) present in the reaction mixture.

Recently, applicants have discovered that by utilizing certain critical reaction conditions, primarily temperature, and to a lesser degree, pressure, the ratio of the two reactants and the use of a more suitable initiator, substantially greater yields of product are obtained compared to the prior art procedure described above. Not only are yields increased three to fourfold and more, but the scope of acetonitrile addition has been extended from only alpha olefins of moderately long chain length to include internal olefins and alpha olefins of relatively extended chain length. Further, the nitriles are produced relatively free of contaminating high molecular weight telomers. Inasmuch as these substantial advantages can be largely attributed to the use of higher and critical reaction temperature ranges, huge increase in selectivity coupled with a large decrease of reaction time could not have been anticipated and represents a substantial and surprising advance in the art.

It is therefore an object of this invention, among others, to provide a process for preparing nitriles of extended chain length from the addition of acetonitrile to olefins of varying carbon chain lengths and varying types, in greatly improved yields.

An additional object of this invention is to provide a process for preparing long chain fatty nitriles, relatively free from telomeric contaminants, in a fraction of the reaction time required by comparable processes of the prior art.

Further objects will suggest themselves after a perusal of this application.

In the broad practice of this invention the above objects are achieved through a process comprising the steps of:

(a) Contacting each mole of olefin reactant to which acetonitrile is to be added with a large molar excess of acetonitrile in the presence of at least a catalytic amount of a relatively heat stable, free radical initiator under elevated pressures at temperatures ranging from about 100° C. to about 220° C., said reactants to re-

[1] J. Chem. Society 1965, 1918.

main in contact with each other in the presence of said initiator for a time sufficient to produce said nitrile addition product in substantial yield, and (b) Separating said nitrile addition products contained therein.

In the favored practice of this invention especially high yields of nitrile addition products are obtained by the addition of acetonitrile to olefins containing from 4 to 40 carbon atoms and higher, by the steps comprising:

(a) Contacting each mole of olefin reactant to which acetonitrile is to be added with from about 50 to 500 moles of acetonitrile, in the presence of about 0.33 to 0.05 mole of tertiary butyl peroxide, at superatmospheric pressures ranging from about 50 p.s.i.g. and upward for a contact time of at least about 0.1 hour, and (b) Separating said nitrile addition product contained therein.

In order to aid in the complete understanding of the inventive concept, the following additional disclosure is submitted:

(A) Olefins.—The olefins which serve as substrates for acetonitrile addition include aliphatic, aromatic and heterocyclic, including linear and/or cyclic compounds containing at least one reactive

group, as well as dienes and trienes. The olefins can be in the form of a single, discrete olefin or mixtures of two or more olefins, either neat or containing considerable amounts of solvent which is inert to the addition reaction. The favored olefinic substrates are the alpha and internal aliphatic mono-olefins containing from about 4 to 40 carbon atoms. These olefins are preferred because they lend themselves readily to acetonitrile addition in good yield and the nitriles produced from them are relatively free from telomeric and other tenacious contaminants. In addition, these olefins are available in large quantities in a refined state at relatively low cost from petroleum sources. Particularly preferred as olefin substrates are those selected from the group consisting of linear monoalkenes branched and unbranched containing 4 to 40 carbon atoms and cyclohexene. These monoalkenes are preferred since they form 1:1 monoalkyl nitrile addition products having 2 more carbon atoms than the monoalkene when reacted with acetonitrile, said nitriles having good potential for industrial applications.

(B) Reaction conditions.—The following disclosure summarizes the reaction parameters used throughout the novel process, using as the prime criteria, the selectivities and conversions obtained. Selectivity as defined herein, refers to the efficiency in initiating the desired addition of acetonitrile to olefin relative to other undesired reactions which take place, such as telomerization. Selectivity, as calculated throughout this disclosure, is obtained by dividing the amount of nitrile addition product formed by the amount of olefin converted. Conversion is only a qualitative indication of successful transformation, since it is calculated by dividing the amount of unchanged olefin obtained by the amount of olefin in the initial charge. As the latter calculation makes no distinction between the desired nitrile product and any other undesired side products, it is less meaningful.

While the inventive process can be extended to the use of diolefin substrates as well as mono-olefins, since the mono-olefins are typical olefinic substrates, this discussion will be conducted as though only mono-olefins are employed.

Similarly, while free radical initiators other than tertiary-butyl peroxide may be utilized, in the inventive process, for ease of expression, the discussion will refer to t-butyl peroxide. Since it is apparent that temperatures, reaction times, initiator concentration and mole ratios of the reactants and initiators to each other are interdependent, the reaction parameters will be discussed only in terms of operable and preferred ranges.

(1) Reaction temperatures.—The choice of reaction temperatures is the single most critical factor in the inventive process. As will be documented by the data presented subsequently (in Table IV), temperatures between about 100° C. and 220° C. produce yields (selectivity) between two and three times those obtained in the prior art and therefore represent the broad operating range. However, since the best balance of selectivity versus reaction time takes place between about 150° C. and 180° C., this represents the preferred range of reaction temperatures.

(2) Reaction pressures.—Inasmuch as the minimum reaction temperatures required for obtaining greatly improved yields exceed the boiling point of acetonitrile, the reactions of necessity must be run at superatmospheric pressures. As far as can be determined, the superatmospheric pressures employed are of convenience rather than of criticality. It would appear from empirical observation that the reaction can probably be run at superatmospheric pressures up to 1000 p.s.i.g., or possibly higher. However, in a flow-type of reactor, envisioned as being conveniently employed, reactants can be periodically injected and products can be periodically removed so that the internal pressure is unlikely to have an opportunity to build up to as high as 1000 p.s.i.g. More likely, pressures ranging from about 50 to about 250 p.s.i.g. would be both acceptable and utilizable when operating within the preferred temperature range.

(3) Free radical initiators.—The choice of initiator is relatively flexible as long as the initiator has a reasonable half-life at the reaction temperature which will permit it to initiate the reaction at a reasonably rapid rate at the given temperature. Suitable initiators include tertiary butylperoxide, t-butyl peracetate, t-butyl perbenzoate or t-butyl hydroperoxide. The preferred initiator is tertiary butyl peroxide. This preference is based upon its relatively long half-life at temperatures between about 100° and 200° C. and the substantial selectivities obtained when it is used as initiator.

The free radical initiator must be present in at least a catalytic (or initiating) amount to obtain substantial quantities of the nitrile addition product. This amount will vary according to the initiator employed and the concentration of olefin used. When tertiary butylperoxide is used as initiator, a mole ratio of from about 0.60 to 6.0 moles of olefin for each mole of initiator can be used. However, a narrower ratio of from about 2.0 to 3.0 moles of olefin for each mole of initiator is preferred.

(4) The reaction time or contact time is the period of time that the two reactants remain in contact with each other in the presence of at least a catalytic amount of initiator. This is a variable dependent primarily upon the reaction temperature and initiator, and, to a lesser extent, upon the olefin, olefin concentration and initiator concentration. In the operating temperature range of about 100° and 200° C., reaction times vary from as little as 0.1 hour up to 25 hours with much shorter reaction times being obtained (0.1 to 2 hrs.) when the reaction is run between 150° and 200° C.

(5) Ratio of acetonitrile to olefins.—Consistently high selectivities have been obtained when large molar excesses of acetonitrile to olefin are used. For example, when tertiary butyl peroxide is the initiator employed at temperatures between 100° to 220° C. and superatmospheric pressures ranging from 50 to 250 p.s.i.g., mole ratios of 50 to 1000 moles of acetonitrile and higher for each mole of olefin present are favored, with a 100 to 200 mole ratio of acetonitrile to olefin being preferred.

(C) Experimental procedure. — Method I — An appropriately sized reaction vessel or reactor equipped with heating and agitating means, and capable of being pressurized, as well as having liquids introduced or being removed through a valve during pressurization (without substantial loss of pressure) is charged with acetonitrile, or acetonitrile and olefin. The vessel is sealed, pressure tested, deoxygenated with an inert gas such as gaseous nitrogen, and is heated to the desired temperature. At this time the desired quantity of free radical initiator and olefin, or free radical initiator alone is introduced through an appropriate device (such as a valve) into the system containing the agitated heated acetonitrile, or acetonitrile and olefin. During the reaction its course may be monitored by periodically withdrawing samples through the valve, without depressurizing, and subjecting them to analysis. After monitoring, when experience indicates the reaction is complete, the reactor is cooled, depressurized and the reaction mixture removed. Volatiles are stripped off by distillation, preferably using a vacuum distillation technique, and the distillate discarded after analysis indicates the absence of product. The non-volatile residue is further treated by chromatography or it can be fractionally distilled under high vacuum (less than 10 mm. of Hg) to effect separation. Analytical methods such as gas chromatography (abbreviated herein as "g.c."), nuclear magnetic resonance, mass spectroscopy and appropriate elemental analysis are used to confirm that the desired nitrile addition product is produced.

Method II.—Alternatively, in a modification of the procedure, acetonitrile, olefin and initiator are added concurrently, either in the same or different solutions, to the cool reaction vessel or reactor. In this procedure the unheated reactor containing the three components is sealed and pressure-tested with inert gas (i.e., nitrogen) as above. Nitrogen pressure, usually about 10 p.s.i.g., is left in the sealed reactor and the reactor is heated rapidly to the desired reaction temperature and the autogenous pressure noted. Again the reaction course can be monitored as before, during and after heating and sealing. At the point when analysis (usually gas chromatography) shows that the substantial conversion of olefin has taken place and no further product formation is likely, the reaction is terminated and the reactor is cooled and depressurized. Again, removal of volatiles by evaporation is undertaken and the residue is vacuum distilled or chromatographed to resolve it into the desired nitrile product free from impurities including telomers. When chromatography is employed a column of chromatographic grade alumina, silica or the like is employed and elution is preferably accomplished using a solvent having favorable separation characteristics.

Having described the inventive process in general terms, the following examples are submitted to supply more specific examples.

EXAMPLE 1—Preparation of decanenitrile

Acetonitrile is added to 1-octene by the general procedure previously described as Method I. Details are as follows:

A 300 ml. capacity autoclave (containing heating, cooling and agitation means, and capable of being pressurized and permitting the injection of or removal of liquids without depressurizing) is charged with 2.86 moles (150 ml.) of acetonitrile at room temperature and subsequently sealed, deoxygenated and pressurized with nitrogen as described under Method I. The autoclave is heated to 180° under autogenous pressure. Four 7.5 ml. portions (30 ml.) of a previously prepared solution comprising 15.0 ml. (0.075 mole) of ditertiary-butyl peroxide and 22.5 ml. (0.15 mole) of 1-octene are added within a period of 52 minutes after pressurizing and heating to 180° C. Gas chromatographic analyses indicates that 94% of the total 1-octene charge (0.12 mole) is converted to other structures, with a selectivity to decanenitrile of 58 percent being obtained. The 154 ml. liquid residue containing the product is stripped of volatiles at 40° C., using a rotary evaporation device under a vacuum of about 20 mm. of mercury. After analysis indicates the absence of product, the distillate is dicarded and the product contained in the residue, after stripping, is isolated by fractionating at 93° C. under a 5 mm. Hg vacuum. Elemental infra-red, nuclear magnetic resonance and mass spectrometic analyses confirm that the desired decanenitrile addition product is formed. Gas chromatographic analysis data establishes that a 36 mol percent yield of nitrile product (based on converted 1-octene) of a 90% pure nitrile is obtained.

EXAMPLE 2—Preparation of hexadecanenitrile

In this example hexadecanenitrile is prepared by the addition of acetonitrile to 1-tetradecane. The technique of Method II in which the two reactants and free radical initiator are added together to the unheated reactor is used.

A 300 ml. capacity autoclave is charged with 2.86 moles (150 ml.) acetonitrile: 0.0095 mole (1.971 g.) of 1-tetradecene and 0.005 mole (1.0 ml.) of di-tertiary butyl peroxide. The autoclave is sealed and the system deoxygenated and pressure-tested with nitrogen, the nitrogen pressure being left at 10 p.s.i.g. The autoclave is rapidly heated to 150° C., raising the autogenous pressure to 70 p.s.i.g. Gas chromatographic analysis showed 70% conversion at the end of one hour and 100% conversion after two hours. The autoclave is cooled rapidly and vented, yielding 140 ml. of a dark yellow liquid. After stripping off the volatile by distillation at atmospheric pressures, the residuum comprises a sludge-like material. This material is purified by loading the material on to a chromatographic column containing neutral alumina and eluting with petroleum ether. The product obtained from the combined petroleum ether eluents is found to be substantially pure and free from telomers. Elemental and infra-red analyses confirm that the expected hexadecanenitrile product is obtained. A yield of 65 mole percent of hexadecanenitrile (based upon a 100% conversion of 0.0095 mole of 1-tetradecane starting material) is obtained.

Four other runs were made using the same reactants and initiator, and the same ratio of reactants to initiator. The average selectivity of the three runs at higher temperatures was 72% compared to 65% of the two runs at 150° C.

EXAMPLE 3.—Preparation of docosanenitrile

In this example, docosanenitrile is prepared by the addition of acetonitrile to 1-eicosene. The technique is that of Method I wherein part of the acetonitrile and all of the olefin are pressurized and heated together and a mixture of free radical initiator and the remainder of the acetonitrile are added to complete the reaction mixture.

After sealing, deoxygenating and pressurizing, as described in Example 2, a reactor containing a charge comprising 2.76 moles (145 mls.) of acetonitrile and 0.0088 mole (2.8 g.) of 1-eicosene is heated to 180° C. After the temperature is stabilized at 140 p.s.i.g. an additional 0.10 mole (5.0 ml.) of acetonitrile is added along with 0.005 mole (1.0 ml.) of di-tertiary butyl peroxide by injection into the pressurized system. About six minutes after the injection, both reaction temperature and pressure reach their maximums of 187° C. and 185 p.s.i.g. respectively. Fourteen minutes later gas chromatography indicates a 93 percent conversion and after 28 minutes no further decrease in the characteristic peak can be noted. At this time the reaction is terminated and 125 ml. of reddish brown liquid and tan solids are obtained. The tan solids are filtered on a Bunchner funnel. Volatiles are stripped from the filtrate at 40° C. under the vacuum afforded by a water aspirator pump producing a dark brown sludge-like material. The filtered tan solid and liquid residue remaining after stripping are combined and dissolved in 10 ml. of petroleum ether and loaded onto a chromatographic column containing about 150 g. of neutral alumina. A colorless and waxy solid is obtained from five 100 ml. fractions of petroleum ether eluent after evaporation. Infra-red analysis indicates that this material is comprised largely of unreacted 1-eicosene and unchanged $C_{20}$ paraffins which are present as an impurity in the 1-eicosene. The eluent is switched to diethyl ether, and the chromatographic separation is continued. The evaporated diethyl ether solutions produce a white powdery solid whose melting point, infra-red and elemental analysis are consistent with that of docosanenitrile. The yield of purified docosanenitrile is 59 mole percent based upon the previously calculated 93% conversion of 0.0088 mole of 1-eicosene starting material.

EXAMPLE 4.—Preparation of cyclohexyl acetonitrile

In this example acetonitrile is added to a cyclic olefin, cyclohexene using Method II. The charge to a 1 liter autoclave comprised 5.72 moles of acetonitrile (300 ml.), 0.020 moles of cyclohexene (2.00 ml., free from NaOH stabilizer) and 0.01 moles (2.0 ml.) of di-tertiary butyl peroxide initiator. After sealing, deoxygenating etc., the reactor is kept at 10 p.s.i.g. with nitrogen and heated to 150° C. while following the reaction through gas chromatography (g.c.). At the end of 3 hours, 83% of cyclohexene is converted and at the end of 4.5 hours the reaction is terminated yielding 272 ml. of yellow liquid. Volatiles are stripped off and the residue is purified by chromatography on alumina, yielding $1 \times 10^{-2}$ moles of a product which infra-red, nuclear magnetic resonance and elemental analysis confirm is the desired cyclohexyl acetonitrile. This represents a selectivity of 60% based on the 83% conversion of substrate obtained on termination.

In a related run the same reactants, temperature and initiator were used. This run resulted in an increased selectivity yield.

EXAMPLE 5.—Preparation of 3-methyl nonanenitrile

In this example acetonitrile is added to 2-octene, an internal olefin in a pressurized reactor under 70 p.s.i.g. at 150° C. using Method II. The charge is 2.86 moles (150 ml.) of acetonitrile, 0.01 mole (1.56 ml.) of purified (passed through neutral alumina) 2-octene and 0.0050 mole (1.00 ml.) of di-t-butylperoxide. After one hour at 150° C. the conversion of 2-octene is 91%, yielding 120 ml. of yellow liquid after cooling and depressurizing. Volatiles are stripped off leaving 2.0 g. of dark brown residue. Infra-red and nuclear magnetic resonance spectroscopy confirm that the purified product is 3-methyl nonanenitrile, and gas chromatographic analysis establishes $5.6 \times 10^{-3}$ moles of product are present. This represents a selectivity of 68% based on 91% conversion of 0.01 moles of 2-octene.

A run with the same reactants, initiator and temperatures was made, varying only in that the ratio of olefin to initiator was slightly decreased. This run resulted in a diminished selectivity yield.

The results of the first five examples and related runs are summarized in Table I which follows:

EXAMPLES 6 TO 24.—Establishing generalized reaction condition parameters for the inventive process In order to establish reaction condition parameters acetonitrile (1 mole) is added to 1-octene (whose behavior is typical of the olefin substrates employed) under varying temperatures ranging from 81° C. to 200° C. at acetonitrile to 1-octene mole ratios ranging between 100:1 to 300:1. The preferred initiator, tertiary butyl peroxide is used at varying initiator to olefin ratios using the experimental procedures referred to as Methods I and II. Table II records the results.

As can be seen from the data, increasing the reaction temperature from 81° C. (the prior art) to 110° C. and above, results in a two to three-fold increase of selectivity in substantially shorter (from 1/8 to 1/200) reaction times. Inasmuch as the same initiator is utilized in all of these examples, the difference is clearly one of reaction temperatures.

TABLE II.—FREE RADICAL INITIATED ADDITION OF ACETONITRILE TO 1-OCTENE [a]

| Ex. | Initiator (t-BuO)$_2$, moles | 1-octene, moles | Rx Temp., ° C. | Rx Time, hrs. | Mole percent [b] Olefin conv. | Decanenitrile selectivity |
|---|---|---|---|---|---|---|
| 6 | 0.015 | 0.030 | 81 | 120 | 71 | 24 |
| 7 | 0.015 | 0.030 | 110 | 18 | 87 | 48 |
| 8 | 0.005 | 0.030 | 115 | 20 | 88 | 48 |
| 9 | [c] 0.045 | 0.030 | 120 | 4.0 | 100 | 51 |
| 10 | [d] 0.015 | 0.030 | 120 | 6.0 | 96 | 55 |
| 11 | 0.015 | 0.030 | 120 | 6.0 | 97 | 64 |
| 12 | 0.005 | 0.010 | 150 | 1.0 | 100 | 51 |
| 13 | [e] 0.015 | 0.030 | 150 | 1.0 | 100 | 54 |
| 14 | 0.030 | 0.030 | 165 | 0.2 | 99 | 61 |
| 15 | 0.015 | 0.090 | 180 | 0.2 | 76 | 44 |
| 16 | 0.015 | 0.060 | 180 | 0.2 | 88 | 49 |
| 17 | 0.015 | 0.030 | 180 | 0.2 | 97 | 59 |
| 18 | 0.015 | 0.030 | 180 | 0.2 | 97 | 60 |
| 19 | 0.015 | 0.030 | 180 | 0.2 | 97 | 65 |
| 20 | 0.010 | 0.020 | 180 | 0.2 | 97 | 57 |
| 21 | 0.0066 | 0.013 | 180 | 0.1 | 97 | 61 |
| 22 | 0.005 | 0.010 | 180 | 0.2 | 97 | 62 |
| 23 | 0.015 | 0.030 | 200 | 0.1 | 76 | 52 |
| 24 | 0.005 | 0.010 | 200 | 0.2 | 94 | 54 |

[a] All runs except Example 6 made in 300 ml. autoclave under autogenous pressure. Acetonitrile 2.86 moles.
[b] Conversion and selectivity determined by gas chromatographic analysis.
[c] Observed 0.035 mole (t-BuO)$_2$ unreacted.
[d] Observed 0.010 mole (t-BuO)$_2$ unreacted.
[e] Observed 0.003 mole (t-BuO)$_2$ unreacted.

EXAMPLES 25 TO 29.—Effect mole ratio plays on selectivity

In order to clearly establish the effect that varying mole ratios of acetonitrile to olefin plays, several runs were made utilizing mole ratios of about 30:1 to about 300:1 of acetonitrile to 1-octene, keeping the reaction temperature at 180° C. Di-tertiary butyl peroxide in all instances is used as the free radical initiator and the procedure is that described under Method I. Table III (which follows) shows that within the 96 to 286 mole ratio, selectivity levels off at 61+2%. At lower mole ratios (32:1) selectivity declines to 44%.

TABLE I.—FREE RADICAL INITIATED ADDITION OF ACETONITRILE TO OLEFINS [a]

| Example | Initiator (t-BuO)$_2$, moles | Olefin, moles | Rx Temp., ° C. | Rx Time, hrs. | Mole percent [b] Olefin conv. | Product nitrile selectivity |
|---|---|---|---|---|---|---|
| 1 | 0.06 | 1-octene, 0.12 | 180 | 0.9 | 94 | 58 |
| 2 | 0.005 | 1-tetradecene, 0.0095 | 150 | 2.0 | 100 | [c] 65 |
| 2 | [d] 0.020 | 1-tetradecene, 0.038 | 150 | 2.0 | 100 | [c] 65 |
| 2 | 0.005 | 1-tetradecene, 0.0095 | 180 | 0.2 | 93 | 84 |
| 2 | 0.005 | ___do___ | 195 | 0.2 | 89 | 62 |
| 2 | 0.005 | ___do___ | 195 | 0.2 | 80 | 70 |
| 3 | 0.005 | 1-eicosene, 0.0088 | 180 | 0.2 | 93 | [c] 59 |
| 4 | [d] 0.005 | Cyclohexene, 0.010 | 150 | 2.0 | 68 | 76 |
| 4 | 0.010 | Cyclohexene, 0.020 | 150 | 2.0 | 83 | [c] 60 |
| 5 | 0.005 | 2-octene, 0.010 | 150 | 2.0 | 91 | 68 |
| 5 | [d] 0.013 | 2-octene, 0.020 | 150 | 2.0 | 95 | 47 |

[a] All runs made in 300 ml. autoclave, acetonitrile 2.86 moles—except as noted.
[b] Conversion and selectivity determined by gas chromatography except where noted.
[d] Isolated by chromatography on neutral alumina.
[c] 1 liter autoclave acetonitrile 5.72 moles.

TABLE III.—EFFECT OF MOLE RATIO ON SELECTIVITY

| Example: | Mole ratio $CH_3CN$ to 1-octene | Percent selectivity |
|---|---|---|
| 25 | 32:1 | 44 |
| 26 | 48:1 | 49 |
| 27 | 96:1 | *61 |
| 28 | 202:1 | 61 |
| 29 | 286:1 | 72 |

*Average of 59%, 60% and 65%.

EXAMPLES 30 TO 37.—Effect of temperature on selectivity

In order to establish the effect of reaction temperature on selectivity, the following work was carried out using mole ratios of acetonitrile to 1-octene of about 100 to 300, and keeping the mole concentration of t-butyl peroxide to olefin generally constant at 0.5 to 1. Method I is the preparative procedure employed. Table IV presents the data.

TABLE IV.—EFFECT OF TEMPERATURE ON SELECTIVITY

| Example: | Temperature, °C. | Selectivity, percent |
|---|---|---|
| 30 | 81 | 24 |
| 31 | 110 | 48 |
| 32 | 115 | 48 |
| 33 | 120 | ¹57 |
| 34 | 150 | ¹54 |
| 35 | 165 | 61 |
| 36 | 180 | ²60 |
| 37 | 200 | ³53 |

¹ Average of three runs.
² Average of six runs.
³ Average of two runs.

As can be seen, there is a leveling off of selectivity increases between 120° C. and 180° C., with a sharply increasing slope between 80 and 120, and a decreasing slope between 180° and 200° C.

As the numerous examples clearly establish, the inventive process is advantageous and produces an unexpected increase in yield (selectivity) as compared to the prior art. Not only are selectivities increased but the gain in yield is obtained in only a fraction of reaction time advocated in the prior art. Further, the nitrile addition products are produced in a readily purified form and can be easily separated from contaminants such as telomers and polymers.

In addition to the above advantages, this invention is advantageous in that numerous modifications and changes can be made without departing from the inventive process. For instance, numerous alpha and internal olefins can be employed as coreactants and the reaction can be conducted with a relatively wide range of reaction temperatures and elevated pressures without substantially affecting selectivity. The metes and bounds of this invention can best be gleaned by an examination of the claims which follow, read in light of the preceding specification.

What is claimed is:

1. A process for preparing monoalkyl 1:1 nitrile addition products of increased carbon chain length, by the addition of acetonitrile to monoalkene substrates containing 4 to 40 carbon atoms, said monoalkene substrates being selected from the group consisting of linear monoalkenes and cyclohexene, comprising the steps of:
   (a) contacting each mole of said monoalkene substrate in an inert atmospheric environment with about 100 to about 200 moles of acetonitrile, in the presence of about one-third to one-half of a mole of tertiary butyl peroxide at temperatures ranging from about 150° C. to 180° C., under atmospheric pressures of from 50 p.s.i.g. to 250 p.s.i.g.,
   (b) continuing said contact of said monoalkene substrate, acetonitrile and tertiary butyl peroxide at superatmospheric pressures and said temperatures for a period ranging from about 0.1 to about 25 hours to produce said 1:1 nitrile addition products, and
   (c) separating said 1:1 nitrile addition products contained therein.

2. The process of claim 1 wherein the monoalkene substrate and tertiary butyl peroxide are added concurrently from a common solution to the acetonitrile.

3. The process of claim 1 wherein the monoalkene and tertiary butyl peroxide are added together from separate solutions.

4. The process of claim 1 wherein the monoalkene is a linear monoalkene containing 8 to 20 carbon atoms.

5. The process of claim 1 wherein the monoalkene is cyclohexene.

References Cited

UNITED STATES PATENTS

| 2,615,915 | 10/1952 | Ladd | 260—465.3 |
| 3,120,558 | 2/1964 | Zachry et al. | 260—465.3 |
| 3,549,697 | 12/1970 | Roberts et al. | 260—465.3 X |
| 3,470,219 | 9/1969 | Hobbs, Jr. et al. | 260—465.3 X |

OTHER REFERENCES

Rokach et al.: C. A., vol. 67, 1967. p. 7001t.
Nikishin et al.: C. A., vol. 66, 1967, p. 75468c.
Allen et al.: J. Chem. Soc., 1965, pp. 1918–1931.

JOSEPH P. BRUST, Primary Examiner

U.S. Cl. X.R.

260—465 R, 465.1, 465.3

PO-1050
(5/69)

UNITED STATES PATENT OFFICE
CERTIFICATE OF CORRECTION

Patent No. 3,739,007           Dated June 12, 1973

Inventor(s) Irving Schwager and Robert M. Suggitt

It is certified that error appears in the above-identified patent and that said Letters Patent are hereby corrected as shown below:

| | |
|---|---|
| Col. I | After names of Inventors, delete "(both c/o Texaco, Inc., P.O. Box 509, Beacon, N.Y. 12508)" and insert --Assignors to Texaco Inc., N.Y., N.Y.-- |
| Col. I, line 69 | "inermediate" should read --intermediate-- |
| Col. 2, line 8 | "closests" should read --closest-- |
| Col. 3, line 14 | "0.05" should read --0.50-- |
| Col. 4, line 9, | "two and three" should read --two to three-- |
| Col. 6, line 66 | "Bunchner" should read --Buchner-- |
| Col. 7, line 17 | "(2.0 ml.)" should read --(2.00 ml.)-- |
| Col. 7, TABLE I. | The Reference mark "d" on third line of Table before "0.020" should read --c-- |
| | The Reference mark "d" on eighth line of Table before "0.005 Cyclohexene, 0.010" should read --c-- |
| | The Reference mark "d" on last line of Table should also read --c-- |
| | The Reference mark "c" appearing on second, third, seventh and ninth line of the last column of Table I under the heading "Product nitrile selectivity" should read --d-- |

UNITED STATES PATENT OFFICE
CERTIFICATE OF CORRECTION

Patent No. 3,739,007          Dated June 12, 1973

Inventor(s) Irving Schwager and Robert M. Suggitt

It is certified that error appears in the above-identified patent and that said Letters Patent are hereby corrected as shown below:

Column 9, Table III. The figure "72" on last line should should read -- 62 --.

Signed and sealed this 23rd day of April 1974.

(SEAL)
Attest:

EDWARD M. FLETCHER, JR.          C. MARSHALL DANN
Attesting Officer                Commissioner of Patents